United States Patent Office 2,883,279
Patented Apr. 21, 1959

2,883,279

METHOD AND ARRANGEMENT FOR REFINING METAL BATHS IN ROTARY FURNACES

Rudolf F. Graef and Ludwig A. von Bogdandy, Oberhausen, Germany, assignors to Huttenwerk Oberhausen Aktiengesellschaft, Oberhausen, Germany.

Application July 24, 1957, Serial No. 673,786

Claims priority, application Germany August 30, 1956

8 Claims. (Cl. 75—59)

The invention relates to an improved method of refining metal baths in rotary furnaces, and an arrangement therefor.

It is an object of the invention to provide a new method for refining metal baths in rotary furnaces by the injection of a gaseous refining agent such as oxygen into the furnace in such a manner, that the losses of energy during the rotary furnace process due to unburnt carbon monoxide and unconsumed oxygen contained in the waste gases are reduced to a minimum.

It is another object of the invention to provide an improved method for refining metal baths by means of a refining agent such as oxygen injected into the furnace, wherein the carbon monoxide formed during the furnace reactions can be, at will, completely or partially burnt to carbon dioxide, while the waste gases leaving the furnace remain substantially free from oxygen.

It is yet another object of the invention to provide for an arrangement for carrying out the new method of refining of metal baths in a rotary furnace by the injection of oxygen into the furnace which arrangemnet permits to control the depth of immersion of nozzle means for the injection of a refining agent below the metal bath surface in the furnace during the rotation of the latter.

It is finally an object of the invention to provide an arrangement for use with a rotary furnace for the refining of metal baths, whereby the CO content of the waste gases from the rotary furnace during the refining process carried out therein can be determined, at will, and whereby the maintenance of a desired CO content rate in the waste gases can be manually or automatically controlled.

The conventional rotary furnace refining process is carried out in a drum-shaped furnace which is adapted for rotation about a horizontal axis and is provided at its ends with openings through which there are introduced tubes whose nozzle ends dip below the surface of the metal bath in the furnace. These tubes serve for injecting the refining agent, for instance oxygen or air, into the metal bath. The waste gases are removed from the furnace through the aforesaid openings.

During this process the gaseous combustion products released from the metal bath consist largely of carbon monoxide.

It is an important advantage of the known rotary furnace refining process that it permits to burn the carbon monoxide in the furnace above the metal bath and thereby to raise the thermic degree of efficiency of the entire process without causing local overheating of the furnace lining, which consists of heat resistant material. For the parts of lining of the interior furnace wall which are heated by the combustion of carbon monoxide in the space above the metal bath, are carried by the rotation of the furnace below the metal bath during which passage they transmit the absorbed heat to the bath. The carbon monoxide containing gases are burnt by oxygen which is introduced through auxiliary nozzles protruding through the above mentioned openings in the end walls of the furnace, and ending in the free space above the metal bath. The amount of oxygen introduced through these auxiliary nozzles should exceed the theoretically required stoichiometrical amount of oxygen for burning the carbon monoxide released from the metal bath, to carbon dioxide, because the oxygen is always partly absorbed by the bath.

If the amount of oxygen in the refining agent introduced into the space above the bath is too much in excess of the aforesaid required amount, then the waste gases will not only contain carbon dioxide but also unconsumed oxygen. If the first mentioned amount of oxygen is less than the required one, then the waste gases will contain unburnt carbon monoxide, the potential thermic energy of which will thus be lost.

Experiments have led to the discovery that that ratio of the amount of refining agent injected additionally into the space above the bath to the amount of refining agent injected below the bath surface, at which the combustion of carbon monoxide to carbon dioxide is complete without the undesirable feature of unconsumed oxygen in the waste gases, varies during the treatment of a charge in the furnace and is largely dependent on the depth of immersion, below the bath surface, of the injection nozzles for the refining agent.

We have found that, if a certain portion of the refining agent is injected into the space above the bath, and the remaining portion is injected below the bath surface at a given depth of immersion of the nozzle means in the bath, so that a determined ratio exists between the first and the last mentioned portions of the injected agent, even minor changes in the depth of immersion of the nozzle means in the bath during the rotation of the furnace will lead to very considerable fluctuations in the carbon monoxide and/or oxygen content of the furnace waste gases.

If, now, the immersed nozzles are stationary relative to the axis of rotation of the rotary furnace, such changes in the depth of immersion are unavoidable because the free internal space constituting the furnace interior is, in practice, hardly ever a perfect body of rotation coaxial with the axis of rotation of the furnace, due to inaccuracies in the masonry forming the lining and irregular wear of the same. Consequently, the bath surface is raised and lowered irregularly in the furnace interior during the rotation of the furnace. The upward and downward movements of the bath surface during each rotation become the greater, the more the internal lining of the furnace is worn, the wear of the furnace lining being, of course, not uniform, and becoming more irregular with time, whereby the fluctuations in the CO content of the waste gases become also increasingly worse.

Moreover, the desirable carbon monoxide content of the waste gases does not remain the same during the entire refining process. While, in the first part of the process it is desirable to provide for a carbon monoxide content in the waste gases which yields the best thermic effect and thus makes it possible ,for instance, to melt down large quantities of ores and/or scrap iron, it is known to be desirable to provide for a higher carbon monoxide content in the waste gases prior to tapping the slag from the furnace, because the iron content of the slag has the undesirable property of increasing with decreasing carbon monoxide contents of the waste gases. If, therefore, the iron content of the slag is to be made as low as possible, for instance, during the period just preceding the tapping of the slag, it may become desirable to increase the carbon monoxide content of the waste gases during that period considerably, for instance, to about 40%.

The invention provides for a satisfactory solution of these problems and attains the above mentioned objects by an improved method of refining metal baths in rotary furnaces which comprises the steps of injecting a first portion of the refining agent such as oxygen or air into the furnace below the metal bath surface and a second portion of the refining agent into the free space of the furnace interior above the metal bath and the slag covering the surface of the latter, at a determined ratio between said first and second portion. This ratio derives from the rates of flow of the refining agent toward (a) the nozzle or nozzles dipping into the metal bath and toward (b) the nozzle or nozzles opening into the free space above the bath. According to the invention, the CO content of the waste gases from the furnace is maintained at a desired value, and losses of unconsumed oxygen through the waste gases are avoided, by controlling either continuously or at intervals, at a given ratio of the rates of flow of the refining agent toward (a) and (b), the level below the metal bath surface in the furnace at which the refining agent is released into the bath, and correcting the depth of immersion of the nozzle or nozzles in the bath. Consequently, the depth of immersion of the nozzles serving for the injection of the refining agent below the bath surface is diminished if the carbon monoxide content in the waste gases leaving the furnace increases above a desired limit value, while, on the other hand, the depth of immersion of the nozzles is increased by lowering the nozzles deeper into the metal bath, if the actual carbon monoxide content in the furnace waste gases decreases below the aforesaid determined limit value. This control can be carried out either manually or automatically, for instance, by electromechanical or photoelectric or electronic means or a combination of several of these means.

According to a further mode of operation, the method according to the invention comprises the additional steps of intentionally increasing the CO content of the waste gases from a range, in which both the CO content and the content of unconsumed oxygen in the refining agent are at simultaneously their lowest value, to a range of about 40% by volume of CO in the waste gases, and then controlling either one or both of the aforesaid functions of refining agent injection to maintain that new level.

It is an important advantage of the new method according to the invention that it permits to achieve the highest possible thermic effect during the rotary furnace refining process without undesirable losses of oxygen during the complete combustion of the gases released by the metal bath in the furnace. The method according to the invention can best be carried out by an arrangement, in which the immersed nozzles for the injection of a refining agent such as oxygen follow even slight changes in the level of the bath surface in the furnace interior, so that at all times the depth of immersion of the nozzles is such that the waste gases leaving the furnace contain the lowest possible amount of carbon monoxide on the one hand, or of unconsumed oxygen, on the other hand. The arrangement also permits to maintain constant a desired higher CO content in the waste gases.

According to another feature of the arrangement according to the invention, the carbon monoxide content of the waste gases is preferably controlled currently, or at regular intervals, with the aid of measuring instruments having a very short time lag of response, which instruments are, for instance, described by Winterlingin "Gaswärme" (1954), pages 138–140, and the literatures cited therein. After the depth of immersion of the nozzles for the refining agent has been initially determined, dependent upon the desired carbon monoxide content of the waste gases, adjustments in the position of the nozzle or nozzles relative to the rotary furnace can be made, as they become necessary due to fluctuations in the level of the bath surface, either by manual actuation of means for raising or lowering the nozzles relative to the furnace, while simultaneously observing the indicating dial of a measuring instrument for the carbon monoxide content of the waste gases, or raising or lowering the furnace end relative to the nozzles which protrude through the end opening of the furnace in the interior thereof. This relative upward or downward displacement between the furnace end and the nozzles, and consequently changes in the depth of immersion of the nozzles into the metal bath, can also be effected automatically in conformity with the variations of the carbon monoxide content of the waste gases, by automatic control and steering devices in the arrangement according to the invention.

The invention will be better understood by the further description thereof in connection with the accompanying drawings in which.

Figure 1:
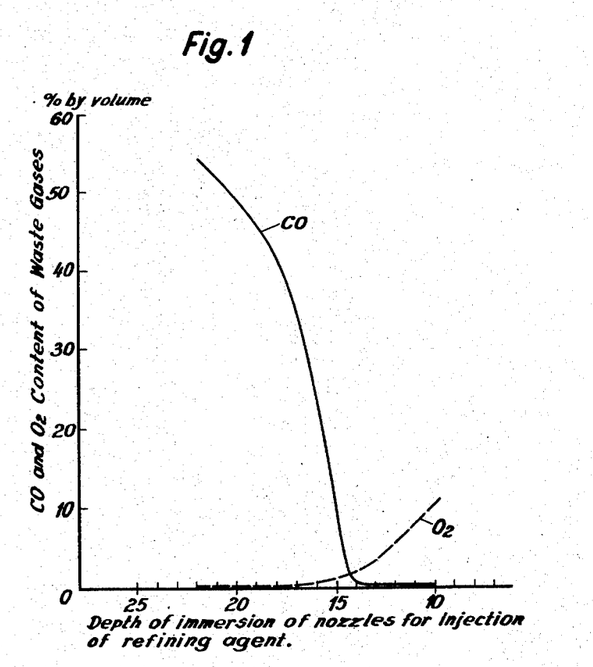
Figure 1 is a diagram showing for a specific example the carbon monoxide and oxygen contents of the waste gases from a rotary furnace as a function of the depth of immersion of the nozzles for the injection of the refining agent.

Figure 1 illustrates how the changes of the carbon monoxide content and the oxygen content in the waste gases depend on the depth of immersion of the nozzles below the bath surface at a given ratio of a first portion of the refining agent injected into the bath below the surface of the latter to a second portion of refining agent injected above the bath surface into the free space. This ratio is 2:3 for the curves illustrated in Figure 1. These curves reveal that, for instance, a change in the depth of immersion from about 14.5 centimeters to about 17.5 centimeters brings about an increase of the carbon monoxide content in the waste gases from 2% to 40% by volume. It can further be seen from Figure 1 that a decrease of the depth of immersion of the immersed nozzles in the bath below 14.5 centimeters leads to a rapid increase in the content of unconsumed oxygen in the waste gases, and is, therefore, generally undesirable.

As already mentioned, the curves shown in Figure 1 are based on a specific example only of a rotary furnace of determined dimensions and for the aforesaid ratio of 2:3 between the refining agent introduced below the bath surface and the refining agent blown into the free space above the bath. However, the general characteristic of these curves remain the same irrespective of changes in the aforesaid proportions.

Figure 2:
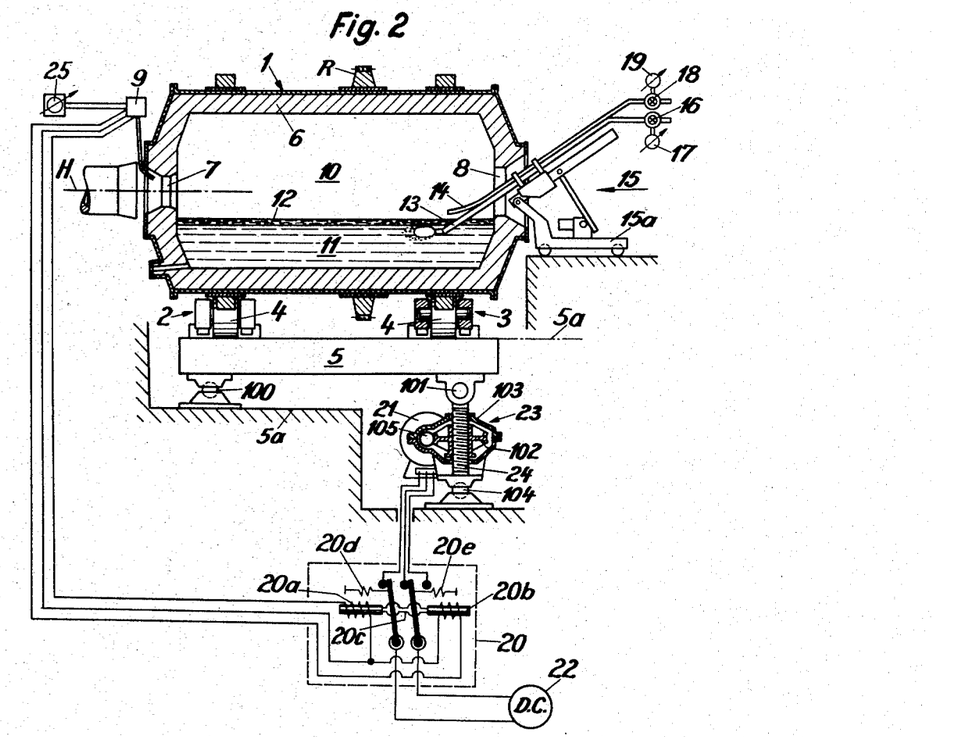
Figure 2 is a perspective, partially sectional view of an arrangement according to the invention comprising stationary injection means for the refining agent protruding into a rotary furnace having a substantially horizontal adjustable rotary axis.
Figure 3:
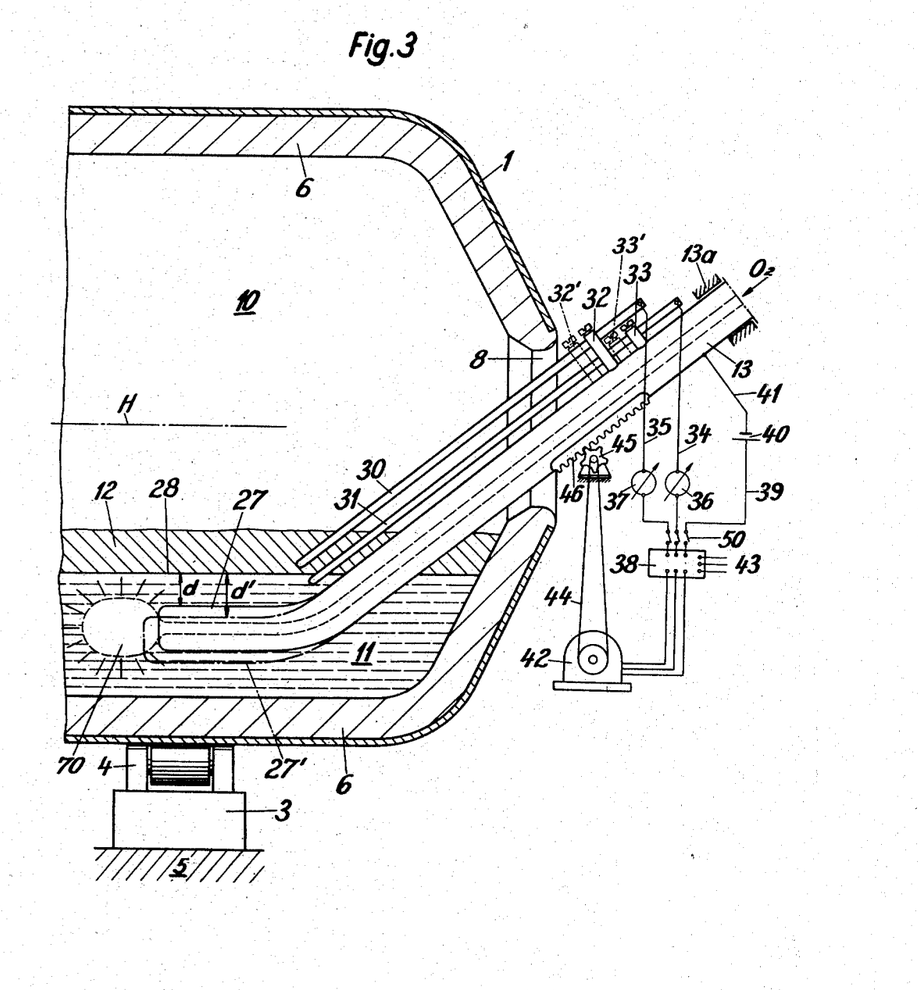
Figure 3 is a schematical cross sectional view of a preferred arrangement according to the invention, illustrating one end of a substantially horizontally arranged rotary furnace provided with adjustable injection means for the refining agent.
Figure 4:
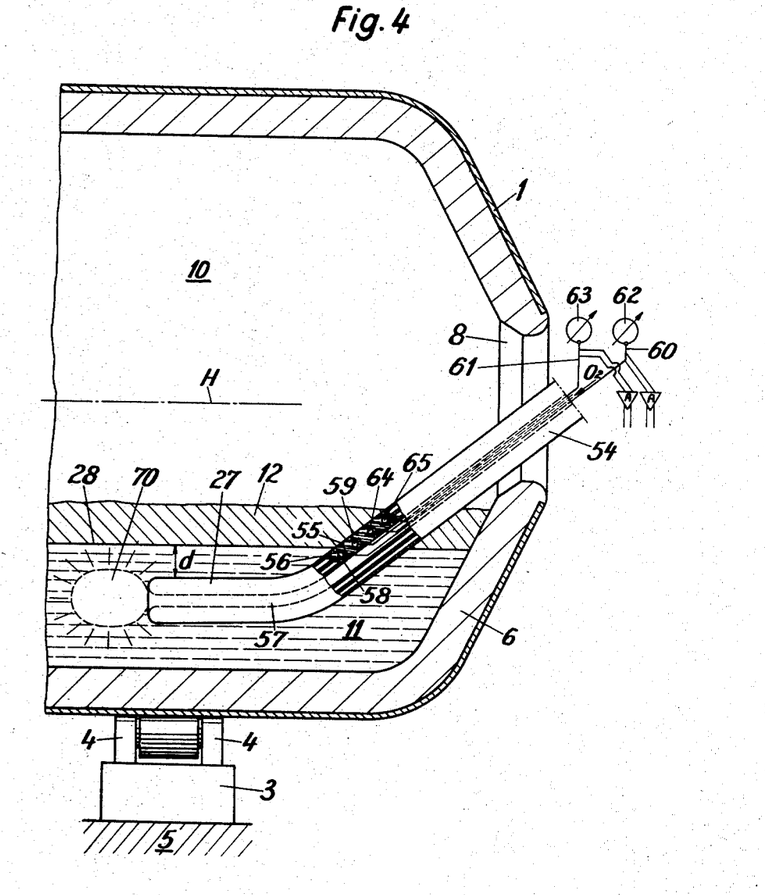
Figure 4 is a view similar to that of Figure 2 showing a somewhat different embodiment of the injection means according to the invention.

Referring now more in detail to Figures 2 to 4 of the drawings, reference numeral 1 indicates a rotary furnace which is adapted to be rotated about a substantially horizontal axis indicated at H. The furnace is equipped with a ring gear R which is engaged by the drive means for rotating the furnace; these are conventional and not shown in the drawings. The furnace is, for instance, supported on bearings 2 and 3 and rollers 4. The bearings 2 and 3 are rigidly mounted on the tiltable base plate 5, one end of which is adjustable as to height above the level of foundation 5a.

The furnace body 1 is provided with an internal heat resistant lining 6, for instance of fire-proof masonry. At its ends, the rotary furnace is provided with openings 7 and 8. In opening 7 which is the outlet opening for the waste gases, there may be arranged a conventional measuring instrument 9 which controls continuously or at intervals the carbon monoxide content of the waste gases escaping from the interior free space 10 of the furnace above the surface of the metal bath 11 and the layer of slag 12 covering the bath. Through opening 8 at the right hand end of the furnace 1 there are introduced into the interior of the rotary furnace, a main injection pipe 13 for the refining agent, for instance air or oxygen, and an auxiliary pipe 14 for introducing the refining agent into the space 10 above the metal bath 11 and slag 12 in the furnace. Both pipe lines 13 and 14 are mounted in a standard 15, on a retractable wagon 15a.

Pipe 13 is provided with valve means 16 for adjusting the rate of flow, and with a gauge 17 for indicating the latter. In a similar manner pipe 14 is provided with valve means 18 for adjusting and a gauge 19 for indicating the rate of flow of oxygen therethrough. By reading gauges 17 and 19, it is possible to set valves 16 and 18, so that oxygen is injected at a determined ratio, for instance 2:3, below and above the bath surface.

In the embodiment of the invention illustrated in Figure 2, the carbon monoxide control instrument 9 which is set to control a desired value by means of the setting device 25, transmits deviations from the set CO content to a regulating relay unit 20 and activates, depending upon the excess or lack in carbon monoxide content of the waste gases, the motor 21 which derives its power from an electric power source 22. Depending on this activation, the motor operates the height adjusting device 23 of the adjustable furnace base plate 5 at the end where bearing 3 is mounted thereon, and either lowers or raises this base plate end, on which the bearing 3 supporting the right hand end of the furnace is mounted by a corresponding rotation of threaded pin 24.

The level of the bath in the interior of the furnace can thereby be determined, at will, for instance by setting the control gauge 25 of the measuring instrument 9 to a desired value of the carbon monoxide content on the basis of the diagram of Figure 1.

In order to permit adjustment of the inclination of the furnace and, thereby, the depth of immersion of the nozzle end 27 of pipe 13 below the bath surface, base plate 5 is tiltable. One end of base plate 5 rests on rocker bearings 100. Pivotally connected to the other end of base plate 5 at 101 is a hinged support in form of a threaded spindle 24. This hinged support 24 meshes with and is guided by a nut 102 which is rotatably journalled in a casing 103. The casing 103 in its turn is tiltably mounted on a bearing 104. The outer circumference of the nut 102 is provided with teeth meshing with a worm 105 of a driving motor 21, which may be an electric motor. When this motor is actuated, the worm 105 turns the nut 102 so that the hinged support or threaded spindle 24 is screwed out of the nut 102 or screwed into the same, thereby lifting or lowering the base plate 5 together with the drum 1, so that the base plate 5 and, consequently, also the drum 1 carries out a tilting movement about the axis of the rocker bearing 100. By varying the direction of rotation of the driving motor for the worm 105, for instance, by reversing the poles of the electric motor 21 drivingly connected to worm 105, the base plate 5 will be alternately lifted and lowered. The reversing of the poles of the electric motor 21 is effected automatically, in a manner known per se, by, for instance, the regulating relay unit 20 which is steered from the carbon monoxide control device 9. Relay unit 20 operates, for instance, in such a way that, if there is excess (or lack) of CO in the waste gases, its left side 20a is energized, while if there is lack (or excess) of CO, its right hand side 20b is energized. If the CO value corresponds exactly to that pre-determined by the setting of motor 25, then relay 20 is not energized. Depending on which relay side is energized, double pole armature 20c is attracted to the left or to the right and causes power from direct electric current power source 22 to drive the motor 21 in clockwise or counterclockwise rotation. If relay 20 is not energized, spring means 20d and 20e hold armature 20c in neutral position and motor 21 stands still.

It has been mentioned above, that at a given time during the refining process, it becomes desirable to considerably increase the carbon monoxide content of the waste gases, up to the order of 40% by volume. As can be seen from Figure 1, this would correspond to an increase of the depth of immersion of the nozzle for injection of the refining agent from approximately 14.5%, i.e. the range in which the CO-curve crosses the $O_2$-curve, by approximately 3 centimeters to a depth of 17.5 centimeters. This may easily be achieved by setting gauge 25 to the desired new carbon monoxide rate of 40%. Control instrument 9 will then cause motor 21 to operate the height adjusting assembly 23 and raise bearing 3 until the necessary greater depth of immersion has been obtained.

According to another, preferred mode of operation, instead of lowering and raising one end of the furnace 1, the latter may remain stationary, and the injection nozzle means for introducing the refining agent into the metal bath may be lowered deeper into that bath, or raised to a higher level in the same, as shall be described in more detail hereinafter in connection with the control arrangement illustrated in Figures 3 and 4.

Referring first to the embodiment illustrated in Figure 3, reference numeral 13 indicates the main pipe for introducing refining agent into the bath 11. The nozzle 27 which is attached to the free end of pipe 13, is at a determined depth $d$ below the surface 28 of the metal bath which is covered with a layer of slag 12. The nozzle-bearing pipe 13 is slidingly displaceable at an inclined angle in the supporting and guiding means 13a. On the pipe 13 there are mounted two adjustable electrically conductive contact rods 30 and 31. These are held in fastening means 32 and 33 which are rigidly connected to the outside of pipe 13.

Once the bath level 28 has been set to a determined height in the furnace 1, contact rods 30 and 31 are so adjusted, that at the desired depth of immersion $d$ of nozzle 27 of pipe 13, the contact rod 31 is just dipping into the metal bath 11, while the contact rod 30 only dips into the slag layer 12 and has its tip located just above the bath surface 28. Contact rods 30 and 31 are connected by way of leads 34 and 35 via ampere meters 36 and 37 each to a relay in a regulating unit 38, and the latter unit is connected via a lead 39 to one pole of a direct current source 40 whose other pole is connected via lead 41 to the metal mass of pipe 13. This circuit is closed by the metal bath itself.

The regulating unit 38 is further connected to a motor 42 and to a source of electric power 43 for driving said motor. Motor 42 is connected, for instance by a belt transmission 44, to a gear 45 which engages a toothed rack 46 provided on the outer wall of pipe 13.

If, during the rotation of the furnace 1 and due to irregularities in its lining 6, the level of the bath surface 28 is lowered so that contact rod 31 no longer dips into the metal bath 11, the relay in regulating unit 38 provided in the circuit of rod 31 becomes practically currentless, because that circuit is interrupted due to the fact that the electric resistance of the slag is several hundred thousand times larger than the electric resistance of the metal bath, the exact ratio between both resistances depending upon the temperature and composition of the melt. In any case, the ratio of these resistances is such that the enormous differences in the conductivity between the metal bath and the slag may be used for the control purposes of this invention.

Now, as soon as the relay connected to contact rod 31 becomes, for all intents and purposes, currentless, it activates the motor 42 to operate gear 45 in counterclockwise rotation. Thereby gear 45 moves rack 46 and consequently pipe 13 at an angle downwardly to the left and increases the depth of immersion of nozzle 27, until contact rod 31 dips again into the bath surface 28. As soon as this occurs, the relay connected to rod 31 is again energized and interrupts the operation of motor 42.

If, on the other hand, irregularities in the lining 6 of furnace 1 cause the level of bath surface 11 to rise until the tip of contact rod 30 dips into bath surface 28, the relay connected to rod 30 via line 34 is energized and activates motor 42 in the opposite sense to rotate gear 45 clockwise, thereby raising rack 46 and pipe 13 until the tip of rod 30 emerges from the bath surface 28. Thereby, current flow through rod 30 is again interrupted and motor 42 comes to a standstill.

In this manner, the position of nozzle 27 and pipe 13 is constantly and automatically adjusted, so that the bath surface 28 is always maintained between the tips of contact rods 30 and 31. The distance between the tips of these two rods determines the susceptibility of the automatic adjustment of pipe 13.

It is also possible to use this control arrangement for changing the depth of immersion of pipe 13, and together therewith the carbon monoxide content of the waste gases of the furnace, at a certain stage in the refining process.

When making the adjustment of pipe 13 and nozzle 27 to the position thereof indicated in dashed lines at 27', in which position nozzle 27 is at a greater depth $d'$, the leads 34, 35 and 39 are cut off from contact with regulating relay unit 38 by means of switch 50. After the adjustment to the desired new depth of immersion $d'$ has been made, and control rods 30 and 31 are in their new position relative to holders 32' and 33', switch 50 is shifted again to make contact and the new level of immersion $d'$ is then controlled in the same manner as described hereinbefore relative to level $d$.

In the embodiment of the control arrangement illustrated in Figure 4, the nozzle bearing pipe 54 is provided with two separate small outlets 55 and 56 in the general region of the level of the metal bath surface 28, which are so positioned that the lower outlet 56 opens into the metal bath, while the upper outlet 55 opens above the metal bath into the slag when the nozzle 27 is at the desired depth $d$. In these outlets, which lead from the main conduit 57 of pipe 54 to the outside of the pipe, there are housed two photo electric cells 58 and 59 which are connected by way of leads 60 and 61 to gauges 62 and 63, which indicate the photo electric currents from cells 55 and 56 respectively. Now, if outlet 56 opens into the metal bath, there is formed in front of it a locally overheated zone similar to the zone which is always present in front of the mouth of nozzle 27. The locally overheated zone in front of outlet 56 emanates a strong light which causes cell 56 to send a much stronger photo electric current through gauge 62 than the current sent through gauge 63 by cell 59, which cell faces the darker slag. This difference in light effects is due, on the one hand, to the reaction between oxygen and metal, generating a great amount of heat in the metal bath zone, and, on the other hand, to the cooling effect which oxygen exercises on the slag, with which it does not enter into any noteworthy reactions. If the metal bath rises excessively to reach the level of outlet 55, gauge 63 will indicate the same strong photo electric current as gauge 62. On the other hand, if the metal bath surface 28 is lowered below the level of outlet 56, gauge 62 will indicate the same low photo electric current as gauge 63.

The adjustment of nozzle bearing pipe 54 to the desired level, at which the metal bath surface 28 is between outlets 55 and 56, can be achieved manually while simultaneously observing instruments 62 and 63 until the pipe 54 is sufficiently raised or lowered, for instance by a rack and gear device similar to that shown in Figure 3, until gauge 62 shows a strong, and gauge 63 shows a weak photo electric current.

By providing further outlets 64 and 65 at different levels in the wall of pipe 54 and housing further photo cells connected to further gauges in these outlets, it is possible to control the immersion of pipe 54 to different depths below the bath surface 28 in the same manner as just described above for the control of depth of immersion $d$ of nozzle 27. Thus, by providing, for instance, four outlets, the depth of immersion of nozzle 27 may be adjusted to three different values; by providing five or more outlets, adjustment to four or more different levels is possible. The level of the bath will be clearly recognized by reading the various gauges connected each to a cell in the different outlets, because the gauges connected to cells from a determined level of the metal bath surface upwardly will all indicate weak photo electric currents, while the remaining group of cells below the lowest cell registering weak current will indicate strong currents on their respective gauges. It is between the neighboring cells indicating one a low and the other a strong current that the level of immersion of nozzle 27 is being controlled at a given instant.

It is also possible to provide amplifying means for the photo electric currents from the neighboring cells between which the bath level is to be maintained, for instance cells 55 and 56, or in the case of more cells those neighboring cells which indicate the bath level. These amplifying means may be connected, for instance, to leads 61 and 60 respectively, and can then be connected to the relays of the regulating unit 38 in Figure 3, thus automatically adjusting the depth of immersion of nozzle 27.

It is of particular advantage to combine the regulation of the immersion of the nozzle with a regulation of the ratio between the amounts of refining agent introduced above and below the bath surface, which ratio must be increased, as has been explained hereinbefore, if the CO-content of the waste gases exceeds a desired value, and which ratio must be decreased, if the CO-content falls below a desired value. In this combination, the step of adjusting the depth of immersion of the nozzle can be used as a coarse adjustment, while the change of the proportions in the ratio of amounts of refining agent injected below and above the bath surface can serve as the fine adjustment for controlling the CO content of the waste gases.

As has been mentioned before, this ratio can be changed by altering the rate of flow through pipes 13 and 14 by manually actuating throttle valves 16 and 18 while simultaneously observing flow meters 17 and 19. The operation of valves 16 and 18 may, of course, also be effected automatically.

It will be understood that this invention is susceptible to modification in order to adapt it to different usages and conditions, and accordingly, it is desired to comprehend such modifications within this invention as may fall within the scope of the appended claims.

What is claimed is:

1. In the process of refining a metal bath covered with slag, in a rotary furnace during the rotation of the latter about a substantially horizontal axis, by injecting gaseous refining agent, on the one hand, into the metal bath below the surface of the latter, and, on the other hand, into the space above the bath surface in order to burn at least partially the carbon monoxide developed from the bath, an improved method of operation comprising the steps of (1) selecting a desired carbon monoxide content which is to be maintained during at least part of the refining process in the waste gases leaving the furnace, during at least part of the refining process by adjusting (a) the level of injection of refining agent below the bath surface, and (b) the ratio between the rate of injection of refining agent, destined for burning carbon monoxide, into the space above the bath and the rate of injection of refining agent below the surface of the bath into the latter to attain said desired content, and (2) maintaining said content of carbon monoxide in the waste gases by continuously controlling and adjusting at least one of the factors (a) and (b).

2. The improvement as described in claim 1, wherein said ratio is first selected and maintained constant, whereupon said level of injection of refining agent below the surface of the bath is continuously controlled and adjusted, to maintain the desired carbon monoxide content of the waste gases, by raising said level nearer to the bath surface, if the carbon monoxide content exceeds the desired one, and by lowering said level further below the bath surface, if the carbon content falls below the desired one.

3. The improvement as described in claim 1, wherein said level of injection is selected and maintained constant, whereupon said ratio between the rate of injection of refining agent introduced above the metal bath for burning the carbon monoxide, and the rate of injection of refining agent into the metal bath below the bath surface is continuously controlled and adjusted, to maintain the desired carbon monoxide content in the waste gases, by increasing said ratio when the carbon monoxide exceeds the desired content, and by decreasing said ratio, when the carbon monoxide content falls below the desired one.

4. The improvement as described in claim 1, wherein the adjustment to the desired carbon monoxide content in the waste gases is attained by the steps of adjusting said content by adjusting the level of injection of refining agent below the bath surface, and simultaneously adjusting said content to the desired one by adjusting said ratio.

5. A control device for regulating the CO-content of the waste gases from a metal refining bath in a rotary furnace, which bath is covered by a layer of slag and the level of which bath varies in said furnace depending on the irregularities of the internal furnace walls, comprising, in combination, pipe means for introducing a gaseous refining agent into said metal bath, said pipe means protruding into the interior of said furnace and being adapted for introducing at least part of said refining agent below the surface of the metal bath therein; injection nozzle means attached to the free end of said pipe means and being normally below the surface of said metal bath so as to inject a part of said refining agent thereinto; supporting means outside of said furnace for displaceably holding and guiding said pipe means; and control means for adjusting the position of said pipe means in said supporting means, and simultaneously therewith the depth of immersion of said nozzle means to the variations in the level of said metal bath, so as to keep the depth of immersion of said nozzle means below the bath surface constant; said control means comprising a first and a second electrically conductive contact rod electrically responsive to variations of the level of said metal bath; said first and second contact rod being mounted upon said pipe in parallel direction thereto, said first contact rod normally dipping into said metal bath, and said second contact rod normally dipping into the layer of slag covering said metal bath.

6. A control device for regulating the CO-content of the waste gases from a metal refining bath in a rotary furnace, which bath is covered by a layer of slag and the level of which bath varies in said furnace depending on the irregularities of the internal furnace walls, comprising, in combination, pipe means for introducing a gaseous refining agent into said metal bath, said pipe means protruding into the interior of said furnace and being adapted for introducing at least part of said refining agent below the surface of the metal bath therein; injection nozzle means attached to the free end of said pipe means and being normally below the surface of said metal bath so as to inject a part of said refining agent thereinto; supporting means outside of said furnace for displaceably holding and guiding said pipe means, and control means for adjusting the position of said pipe means in said supporting means, and simultaneously therewith the depth of immersion of said nozzle means to the variations in the level of said metal bath, so as to keep the depth of immersion of said nozzle means below the bath surface constant; said control means comprising a first and a second electrically conductive contact rod electrically responsive to variations of the level of said metal bath; said first and second contact rod being mounted upon said pipe in parallel direction thereto, said first contact rod normally dipping into said metal bath, and said second contact rod normally dipping into the layer of slag covering said metal bath; a relay unit, a D.C. source and an electric motor for effecting the displacement of said pipe means relative to said supporting means, said first and second contact rod being electrically connected to said relay unit, said relay unit being connected to one pole of said D.C. current source and to said motor, and said metal pipe being connected to the other pole of said D.C. current source.

7. A control device for regulating the CO-content of the waste gases from a metal refining bath in a rotary furnace, which bath is covered by a layer of slag and the level of which bath varies in said furnace depending on the irregularities of the internal furnace walls, comprising, in combination, pipe means for introducing a gaseous refining agent into said metal bath, said pipe means protruding into the interior of said furnace and being adapted for introducing at least part of said refining agent below the surface of the metal bath therein; injection nozzle means attached to the free end of said pipe means and being normally below the surface of said metal bath so as to inject a part of said refining agent thereinto; supporting means outside of said furnace for displaceably holding and guiding said pipe means, and control means for adjusting the position of said pipe means in said supporting means, and simultaneously therewith the depth of immersion of said nozzle means to the variations in the level of said metal bath, so as to keep the depth of immersion of said nozzle means below the bath surface constant; said control means comprising a first and a second electrically conductive contact rod electrically responsive to variations of the level of said metal bath; said first and second contact rod being mounted upon said pipe in parallel direction thereto, said first contact rod normally dipping into said metal bath, and said second contact rod normally dipping into the layer of slag covering said metal bath; a relay unit, a D.C. source and an electric motor for effecting the displacement of said pipe means relative to said supporting means, said first and second contact rod being electrically connected to said relay unit, said relay unit being connected to one pole of said D.C. current source and to said motor, and said metal pipe being connected to the other pole of said D.C. current source; a toothed rack mounted on the outer wall of said pipe means, gear means drivingly engaging said toothed rack, and transmission means for connecting said motor to said gear means.

8. A control device for regulating the CO-content of the waste gases from a metal refining bath in a rotary furnace, which bath is covered by a layer of slag and the level of which bath varies in said furnace depending on the irregularities of the internal furnace walls, comprising, in combination, pipe means for introducing a gaseous refining agent into said metal bath, said pipe means protruding into the interior of said furnace and being adapted for introducing at least part of said refining agent below the surface of the metal bath therein, injection nozzle means attached to the free end of said pipe means and being normally below the surface of said metal bath so as to inject a part of said refining agent thereinto; supporting means outside of said furnace for displaceably holding and guiding said pipe means, and control means for adjusting the position of said pipe means in said supporting means, and simultaneously therewith the depth of immersion of said nozzle means to the variations in the level of said metal bath, so as to keep the depth of immersion of said nozzle means below the bath surface constant; said control means comprising photoelectric cell means responsive to the differences in the light effects from the metal bath and the slag layer and thereby to variations in the level of said metal bath in the furnace; said pipe means being provided with a plurality of outlets at the central portion of the pipe means, which outlets face said metal bath and slag layer in the vicinity of the level of the metal bath; said photoelectric cell means comprising a plurality of photoelectric cells each of which is arranged in one of said outlets, and amplifying and indicating means to which each of said photoelectric cells is electrically connected.

References Cited in the file of this patent

UNITED STATES PATENTS

| | | |
|---|---|---|
| 1,139,888 | Mellen | May 18, 1915 |
| 1,481,747 | Saltrick | Jan. 22, 1924 |
| 1,686,087 | Hill | Oct. 2, 1928 |
| 2,211,606 | Pratt | Aug. 13, 1940 |
| 2,246,907 | Webster | June 24, 1941 |
| 2,546,937 | Wyandt | Mar. 27, 1951 |
| 2,612,366 | Wheeler | Sept. 30, 1952 |
| 2,702,476 | De Boisblanc | Feb. 22, 1955 |
| 2,817,584 | Kootz | Dec. 24, 1957 |

UNITED STATES PATENT OFFICE

CERTIFICATE OF CORRECTION

Patent No. 2,883,279              April 21, 1959

Rudolf F. Graef et al.

It is hereby certified that error appears in the printed specification of the above numbered patent requiring correction and that the said Letters Patent should read as corrected below.

Column 8, lines 68 and 69, strike out "during at least part of the refining process".

Signed and sealed this 4th day of April 1961.

(SEAL)
Attest: ERNEST W. SWIDER

~~XXXXXXXXXXX~~
Attesting Officer

ARTHUR W. CROCKER
Acting Commissioner of Patents